(12) United States Patent
Ramírez-Pérez et al.

(10) Patent No.: US 10,816,688 B2
(45) Date of Patent: Oct. 27, 2020

(54) METHOD AND APPARATUS FOR MEASURING SEISMIC DATA

(71) Applicant: EQUINOR ENERGY AS, Stavanger (NO)

(72) Inventors: Adriana Citlali Ramírez-Pérez, Oslo (NO); Torgeir Wiik, Trondheim (NO); Fredrik Andersson, Eslov (SE)

(73) Assignee: EQUINOR ENERGY AS, Stavanger (NO)

( * ) Notice: Subject to any disclaimer, the term of this patent is extended or adjusted under 35 U.S.C. 154(b) by 331 days.

(21) Appl. No.: 15/502,946

(22) PCT Filed: Aug. 15, 2014

(86) PCT No.: PCT/EP2014/067519
§ 371 (c)(1),
(2) Date: Feb. 9, 2017

(87) PCT Pub. No.: WO2016/023598
PCT Pub. Date: Feb. 18, 2016

(65) Prior Publication Data
US 2017/0235001 A1  Aug. 17, 2017

(51) Int. Cl.
*G01V 1/36* (2006.01)
*G01V 1/30* (2006.01)

(52) U.S. Cl.
CPC .............. *G01V 1/362* (2013.01); *G01V 1/30* (2013.01); *G01V 2210/57* (2013.01)

(58) Field of Classification Search
CPC ...................................................... G01V 1/362
USPC .......................................................... 702/14
See application file for complete search history.

(56) References Cited

U.S. PATENT DOCUMENTS

| | | | | |
|---|---|---|---|---|
| 4,061,907 A | * | 12/1977 | Okamoto | G05B 19/4103 708/270 |
| 2005/0273265 A1 | * | 12/2005 | Ren | G01V 1/28 702/14 |
| 2010/0299069 A1 | | 11/2010 | Moore | |
| 2011/0205844 A1 | | 8/2011 | Maucec et al. | |

(Continued)

FOREIGN PATENT DOCUMENTS

GB        2501934 A     11/2013
WO    2014029415 A1     2/2014

OTHER PUBLICATIONS

Dave Hale: "Image-Guided Blended Neighbor Interpolation of Scattered Data", SEG Technical Program Expanded Abstracts, Jan. 1, 2009, pp. 1127-1131.

(Continued)

*Primary Examiner* — Eman A Alkafawi
(74) *Attorney, Agent, or Firm* — Eversheds Sutherland (US) LLP (57) ABSTRACT

The present invention relates to a method of processing seismic data. The method may include calculating a number of calculated structure tensors for each of a number of seismic data lines, the seismic data lines being spatially distributed about an area of the surface of the Earth. The method also may include interpolating the calculated structure tensors to find interpolated structure tensors in a region of the area between the lines of the seismic data lines, and calculating calculated seismic data from the interpolated structure tensors.

17 Claims, 5 Drawing Sheets

(56) References Cited

U.S. PATENT DOCUMENTS

| | | | | |
|---|---|---|---|---|
| 2012/0307593 A1* | 12/2012 | Guillaume | ............... | G01V 1/30 367/53 |
| 2013/0064040 A1* | 3/2013 | Imhof | .................... | G01V 1/306 367/73 |
| 2015/0030209 A1* | 1/2015 | Bounaim | ............... | G01V 1/301 382/109 |
| 2015/0301208 A1* | 10/2015 | Lewis | .................... | G01V 1/282 702/14 |
| 2016/0139282 A1* | 5/2016 | Dimitrov | ............... | G01V 1/302 703/2 |

OTHER PUBLICATIONS

Wilfred Whiteside: "3D Imaging from 2D Seismic Data, an Enhanced Methodology", SEG Houston 2013 Annual Meeting, 2013, pp. 3618-3622.

* cited by examiner

METHOD AND APPARATUS FOR MEASURING SEISMIC DATA

TECHNICAL FIELD

The present invention relates to a method of and apparatus for processing seismic data acquired from a region of the Earth. Such a technique has use in determining information about subsurface structure in the region.

BACKGROUND OF THE INVENTION

Seismic reflection is a technique used to determine details of structures beneath the surface of the Earth. The resolution that may be achieved makes this technique the method of choice for oil exploration and mapping of subsurface rock structures. It is also applicable to experimental research that probes the fine structure within the Earth's crust and at the crust-mantle boundary.

The technique involves generating downward-propagating seismic waves in succession at a number of locations within the region being explored. A large number of receivers are positioned at intervals away from each source location and these receivers record the amplitudes (for example, in terms of pressure, displacement or its derivative) of seismic waves reflected back up to the surface from subsurface inhomogeneities over a period of time. The recorded waves are usually deconvolved, removing the effects of the source and receiver (which have their own response functions).

Reflection data typically have low amplitudes and are contaminated by multiple reflections and other kinds of noise. Various acquisition and processing techniques may be used to improve signal-to-noise ratios, such as averaging (stacking) of traces with the same midpoint, taking into account different distances between source and receiver, and discrimination of multiple reflections based on either their periodicity or wavefront angles which differ from the primary reflections. Further, the data may be correctly positioned in space by a process called migration, which moves dipping events (relating to tilted or dipped subsurface geological features such as beds, faults, or other planar features) into their correct position. When comparisons are made between two or more datasets over the same area, careful analysis between the amplitude, time and other attributes of the datasets may be made.

After the appropriate corrections, which may further include correction for other known environmental variables, the data are combined to provide a graphical representation of the subsurface inhomogeneities.

Seismic reflection data obtained by field experiments are then processed to obtain a three-dimensional (3D) image of subsurface structures as described above. The three dimensions refer to the spatial dimensions "illuminated" by the seismic data. The vertical axis may represent depth or two-way vertical seismic wave travel time.

The amplitudes of reflected seismic waves are indicative of the subsurface reflection strengths, contaminated by noise. The reflection strength depends upon the reflection coefficient, which may be defined as a function of the relative contrasts of the elastic material properties of the subsurface layers.

In general, the elastic properties vary spatially. In order to explain the relationship between the elastic properties and the seismic data it may be convenient to imagine the subsurface as a stack of geological layers. The layer properties are described by the elastic properties of the rocks within the layers while the seismic data are related to the contrasts of the layer properties between successive layers. The seismic data are therefore suitable for interpreting subsurface layer structures since they image the boundaries between the layers.

In many exploration scenarios one is faced with a variety of two-dimensional (2D) seismic lines or traces, which may have been acquired for different purposes and at different times. Further, they may form an irregular grid of data, for example where the lines are shot in different directions. Moreover, 2D migrated lines often do not tie at intersections of the lines, depending on the geological strike and dip directions. In this respect, strike and dip refer to the orientation or attitude of a geologic feature. The strike line of a bed, fault, or other planar feature is a line representing the intersection of that feature with a horizontal plane. The dip gives the steepest angle of descent of a tilted bed or feature relative to a horizontal plane.

In view of the irregular spacing of data, with migrated lines that do not tie at intersections, interpretation can be challenging. It is also challenging to transfer the interpretation to a 3D setting. This is considered to be important for the proper evaluation of frontier areas of exploration.

One method of processing seismic data to address these issues, which uses the technique of sparse wavenumber inversion, is disclosed in GB 2501394. In this method, a plurality of spatially distributed seismic traces across a region is received. Each trace is then assigned to a respective one of a plurality of cells that are spatially regularly distributed across the region. For each of the plurality of cells, a regularly spaced data set is constructed from the traces assigned to the cell and a number of neighbouring cells by performing a sparse wavenumber inversion. The output of the inversion is transformed into the time-space domain to obtain a spatially regular data set. This data set can then be migrated or re-migrated.

Whilst this solution does allow for migrated data lines to be transferred to a 3D setting, it can have severe aliasing issues, which in turn affect the accuracy of the data output from the method. One reason for these aliasing issues arises due the sparse nature of the starting seismic data.

SUMMARY OF THE INVENTION

The present inventor has appreciated the desirability of producing an improved seismic data processing method.

In one aspect, the invention provides a method of processing seismic data, comprising:
(a) calculating a plurality of calculated structure tensors for each of a plurality of seismic data lines, the seismic data lines being spatially distributed about an area of the Earth's surface;
(b) interpolating the calculated structure tensors to find interpolated structure tensors in a region of the area between the lines of the seismic data lines; and
(c) calculating calculated seismic data from the interpolated structure tensors.

The inventors have found it advantageous to calculate the structure tensors of the seismic data, and then to interpolate the calculated structure tensors, rather than, for example, to merely interpolate the seismic data itself. However, calculating the structure tensors involves an inherent amount of estimation. Thus, it was counter intuitively found that first calculating structure tensors, then interpolating the structure tensors and then reconstructing seismic data from the interpolated structure tensors produces a more accurate interpretation. The reason for this is that the inventors have found that the calculated structure tensors typically vary more slowly across with respect to distance (e.g. across an area/region) than the seismic data itself.

In general, structure tensors contain information about the gradient of a function. Thus, the calculated structure tensors of the present invention contain information about the gradient, and hence directionality, of the seismic data.

The present invention may be considered to be a data-driven method. In seismology, algorithms and methods can be data-driven or model-driven. One advantage of data-driven methods is that no model, and hence less information, is required. A model-driven method requires the presence of a model, such as a geological model, which can be costly in terms of computing power when running the algorithm.

Each of the plurality of structure tensors may be calculated at different locations on the seismic data lines. In the recording of seismic data lines, data are typically discretely sampled. Preferably, a structure tensor is calculated for each of the samples. A structure tensor may be calculated at each of the different locations. The interval (in space and/or time) between adjacent structure tensors may be the same as the interval (in space and/or time) between adjacent seismic data samples. Alternatively, the interval between the structure tensors may be less than the interval between the seismic data samples; for example, the structure tensors may be sub-sampled. Alternatively, the interval between the structure tensors may be more than the interval between the seismic data samples.

The seismic data may be measured at discrete locations along the line. The structure tensors may be calculated at discrete locations along the line. The location of the structure tensors may correspond to the location of the samples of seismic data.

By "location", it is meant the location in time and/or space.

Adjacent spatial positions at which samples of seismic data are taken along the seismic data line may be between 5 m and 100 m, or preferably between 10 m and 50 m, or preferably between 12.5 m and 20 m, apart. The spatial positions of adjacent calculated structure tensors along the seismic data line may be between 5 m and 100 m, or preferably between 10 m and 50 m, or preferably between 12.5 m and 20 m, apart. Samples of seismic data may be taken at each spatial location at intervals of between 1 ms and 20 ms, or preferably 1 ms and 10 ms, or preferably 1 ms and 4 ms. Structure tensors may be calculated at each spatial location at intervals of between 1 ms and 20 ms, or preferably 1 ms and 10 ms, or preferably 1 ms and 4 ms.

The seismic data used in step (a) may be 2D seismic data.

The calculated seismic data may be 3D seismic data. Thus, the method may allow for direct transfer of 2D interpretations to a 3D setting. The method may construct spatially regular 3D seismic data sets from spatially irregular 2D seismic data sets.

Step (a) may further comprise: estimating a gradient vector by estimating components of the gradient of the 2D seismic data within the 2D plane of the 2D seismic data and calculating the outer product of the estimated gradient vector.

The gradient vector may be estimated at each of the discrete locations discussed above.

Estimating the gradient vector and the components of the gradient vector may comprise calculating the gradient vector and the components of the gradient vector.

The gradient vector may be a 3D gradient vector. Two components of the 3D vector may be in the plane of the 2D seismic data. These two components may be obtained/calculated/measured/estimated from the 2D seismic data. The third component may be out of the 2D plane. This component may be estimated/calculated using seismic data from one or more other seismic data lines that intersect the seismic data line for which the gradient vector is being estimated.

The structure tensors may be 3×3 matrices.

Calculating the outer product of the estimated gradient vector may comprise calculating the outer product of the estimated gradient vector with itself.

Thus, the structure tensors may first be formed in the 2D plane of the seismic data by estimating the in-plane components of the gradients, forming the outer-product and applying Gaussian smoothing. The calculated structure tensors may therefore be calculated along the seismic data lines.

Step (a) may further comprise applying smoothing. Applying smoothing to the calculated structure tensors acts to stabilise the calculated structure tensors. The smoothing may, for example, be Gaussian smoothing or Kaiser-Bessel smoothing.

The seismic data may be wavefield data.

Step (b) may comprise: calculating eigenvalues and eigenvectors of each of the calculated structure tensors; stepping the interpolation using the eigenvalues and eigenvectors to calculate the interpolated structure tensors adjacent the calculated structure tensors; and repeating the eigenvalue and eigenvector-calculating step and the stepping step for the interpolated structure tensors until interpolation throughout the region(s) is complete.

The eigenvector, and corresponding eigenvalue, used for the stepping step may be tangential to the wavefield. The eigenvalue of the tangential eigenvector is approximately the singular eigenvalue of the structure tensor. It is this dominant eigenvalue and its eigenvector which can be, at least primarily, used to interpolate the structure tensors.

To calculate a first set of interpolated structure tensors, the eigenvalues and eigenvectors of the calculated structure tensors may be used. To calculate subsequent interpolated structure tensors (e.g. at locations further from the seismic data line than preceding interpolated structure tensors), the eigenvalues and eigenvectors of the preceding interpolated structure tensors may be used. Eigenvalues and eigenvectors of the interpolated structure tensors may be calculated and used for subsequent stepping.

The stepping may be highly dependent on survey geometry. A stepping interval (in space and/or time) may be approximately a factor of 10 smaller than the interval between adjacent seismic lines. For example, if the spacing between adjacent lines is 500 m, the stepping spacing between interpolated structure tensors may be 50 m. The stepping spacing may be up to several kilometres, and may be as little as 10 m or 12.5 m. The stepping interval may be greater than or equal to the interval between the seismic data samples along the lines.

Having calculated the structure tensors at the seismic data lines, the calculated structure tensors can be interpolated into the blank spaces of the area, and then used to reconstruct an approximation of the wavefield. The reconstructed wavefield may be 3D seismic data. The reconstructed seismic data may be a (pseudo) 3D cube.

The seismic data lines may comprise 2D zero-offset stacks. The traces of each 2D zero-offset stack may be positioned along the respective lines.

The lines may be sparsely distributed over the area of the Earth's surface. For example, the neighbouring lines may be more than 500 m, 1 km, 2 km, 3 km, 4 km, 5 km or 10 km apart from one another. Of course, due the irregularity of the gathered data lines, the data lines may also intersect with one another, forming an irregular grid of data lines.

The lines may be irregularly distributed over the areas of the Earth's surface.

The seismic data lines may be received prior to step (a). The seismic data lines may be received or collated from one or more previous seismic surveys. The data may have been acquired at different times, possibly years apart, and/or for different purposes.

The seismic data lines may comprise non-migrated or de-migrated seismic data.

The method may comprise, prior to step (a), performing de-migration to migrated seismic data to produce the seismic data lines.

The method may further comprise performing migration, or re-migration, to the seismic data after step (c). Migration, or re-migration, can be performed on the seismic data lines used in step (a) and/or the calculated seismic data of step (c). The (re-)migration may be 3D migration. Thus, a consistent 3D depth cube can be constructed starting from 2D seismic data lines. The 3D depth cube may tie at intersections.

The seismic data lines may comprise measured seismic data.

In another aspect, the invention provides a computer program product comprising instructions that when executed will cause a processor to perform a method as described above. The computer program product may be non-transitory.

The program may be stored on a storage medium.

In another aspect, the invention provides transmission of a program as described above a communications network.

In another aspect, the invention provides a computer programmed to perform a method as described above.

In another aspect, the invention provides an apparatus for processing data representing a physical system, the apparatus being arranged to perform a method as described above.

BRIEF DESCRIPTION OF THE DRAWINGS

Certain preferred embodiments will now be described by way of example only and with reference to the accompanying drawings, in which.

DETAILED DESCRIPTION OF THE INVENTION

Figure 1:
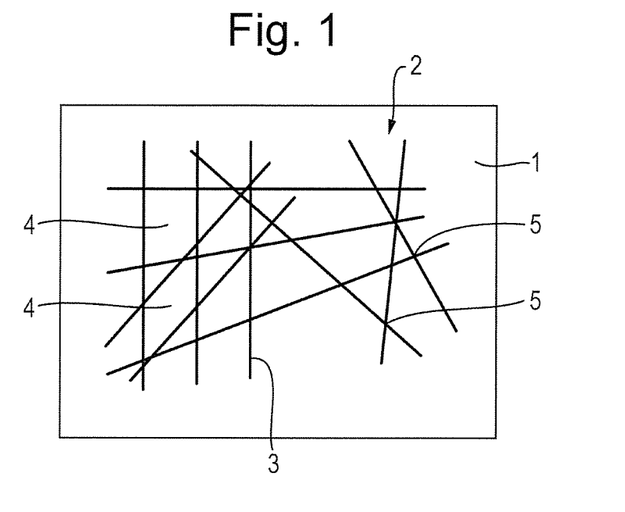
FIG. 1 illustrates an area of the Earth over which seismic data has been acquired.

With reference to FIG. 1, a spatially irregular grid 2 of 2D seismic wavefield data lines 3 has been recorded over an area 1 of the Earth. This grid 2 may be made by a collection of data sets measured at different times. These may even have been recorded by different parties. The 2D seismic wavefield data is non-migrated, or de-migrated, 2D zero-offset seismic data. Between the distributed 2D seismic wavefield data lines is a plurality of regions 4 where no seismic wavefield data has been measured. The 2D seismic wavefield data lines 3 are non-migrated and/or de-migrated seismic wavefield data lines that tie at intersections 5.

Figure 2:
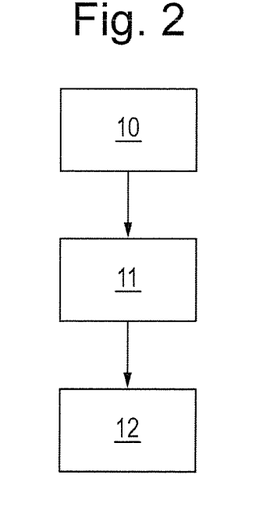
FIG. 2 illustrates a method according to an embodiment of the present invention.

As shown in FIG. 2, an embodiment of the method of the present invention comprises the step of calculating 10 a plurality of calculated structure tensors for each of the 2D wavefield seismic data lines 3. The step of calculating 10 includes estimating a gradient vector by estimating components of the gradient of the 2D seismic wavefield data within the 2D plane of the 2D seismic wavefield data. Once the gradient vector has been estimated the calculated structure tensors are calculated by calculating the outer product of the estimated gradient vector with itself. Gaussian smoothing is then applied.

Thus, the structure tensors are formed in the 2D plane of the seismic wavefield data by estimating the in-plane components of the gradients, forming the outer-product and applying Gaussian smoothing. The calculated structure tensors are therefore calculated along the seismic data lines 3.

The next step of the embodiment is to interpolate 11 the calculated structure tensors to find interpolated structure tensors in the regions 4 of the area 1 between the 2D seismic wavefield data lines 3. The interpolating step 11 initially comprises calculating eigenvalues and eigenvectors of each of the calculated structure tensors. The interpolation is then stepped using the eigenvalues and eigenvectors to calculate interpolated structure tensors adjacent the calculated structure tensors. The interpolation then continues by calculating the eigenvectors and eigenvalues of the interpolated structure tensors to step the interpolation to produce subsequent interpolated structure tensors. The interpolation process continues until interpolation throughout the regions is complete.

The eigenvector, and corresponding eigenvalue, used for the stepping step is the eigenvector tangential to the wavefield. The eigenvalue of the tangential eigenvector is approximately the singular eigenvalue of the structure tensor. It is this dominant eigenvalue and its eigenvector which are used to interpolate the structure tensors.

Thus, having calculated the structure tensors for the 2D seismic wavefield data lines at step 10, the calculated structure tensors can be interpolated throughout the area 1 at step 11.

The next step of the embodiment is to use the interpolated structure tensors to reconstruct an approximation of the wavefield. This is done by calculating 12 calculated seismic data from the interpolated structure tensors.

In summary, a technique has been disclosed of interpolating structure tensors for the construction of spatially regular 3D data sets from spatially irregular 2D data sets. A technique has also been disclosed of using 2D de-migration followed by 3D re-migration to undo errors made using 2D migration, thus allowing for the transfer of large scale interpretations from 2D to 3D.

An advantage of using an embodiment of the present invention is to allow for direct transfer of 2D interpretations to a 3D setting. This will aid in the evaluation of areas in frontier exploration.

An advantage of using an embodiment of the present invention is to allow construction of a consistent 3D depth cube that ties in at intersections, due to proper 3D migration afterwards. The methods described above may be embodied purely in hardware or may be embodied at least in part in a program for controlling a computer to perform at least some (perhaps all) of the steps. The program may be stored on a computer-readable storage medium, for example hard or floppy discs, CD or DVD-recordable media or flash memory storage products. The program may also be embodied in a signal such as a downloadable data signal transmitted across a computer network, for example the Internet or a group of computers connected together in a LAN. Any appended claims now or in future are to be interpreted as covering a computer program by itself, or as a record on a carrier, or as a signal, or in any other form.

Figure 3:
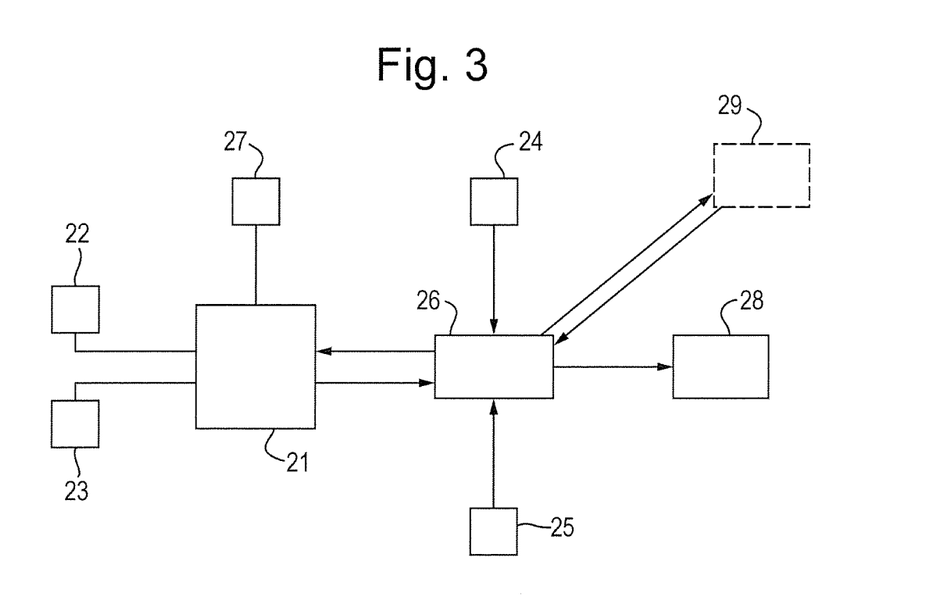
FIG. 3 illustrates a block diagram of an apparatus according to an embodiment of the present invention.

The schematic diagram of FIG. 3 illustrates a central processing unit (CPU) 21 connected to a read-only memory (ROM) 22 and a random access memory (RAM) 23. The CPU is provided with measured seismic data 24 and any other input data 25 via an input/output mechanism 26. The CPU then performs the method steps described above on the provided data in accordance with program steps or instructions provided by the program storage 27 (which may be a part of the ROM 22) and provides output data 28 via the input/output mechanism 26. The program itself, or any of the inputs and/or outputs to the system may be provided or transmitted to/from a communications network 29, which may be, for example, the Internet.

The appended schematic workflow diagram can be considered not only to depict a series of method steps, but also to depict apparatus for performing those method steps. In this respect, a functional block depicted in a workflow diagram can be considered to represent a component such as a processor or processing unit which is adapted to or at least operable to perform the depicted function. Operation of one or more of these components can be controlled or provided at least in part by a program operating on the device or apparatus. The function of several depicted components may in fact be performed by a single component, such as the CPU 21, under control of the program.

One or more of the components may be provided as dedicated hardware.

Figure 4A:
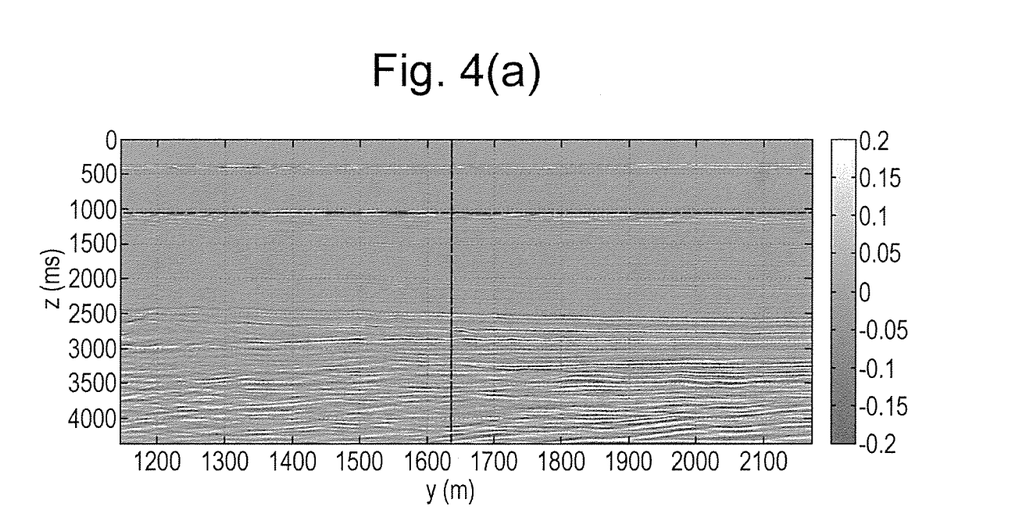
FIGS. 4(a) to (f) show the results of a comparison of the data output from this method with a data from a known dataset.
Figure 4B:
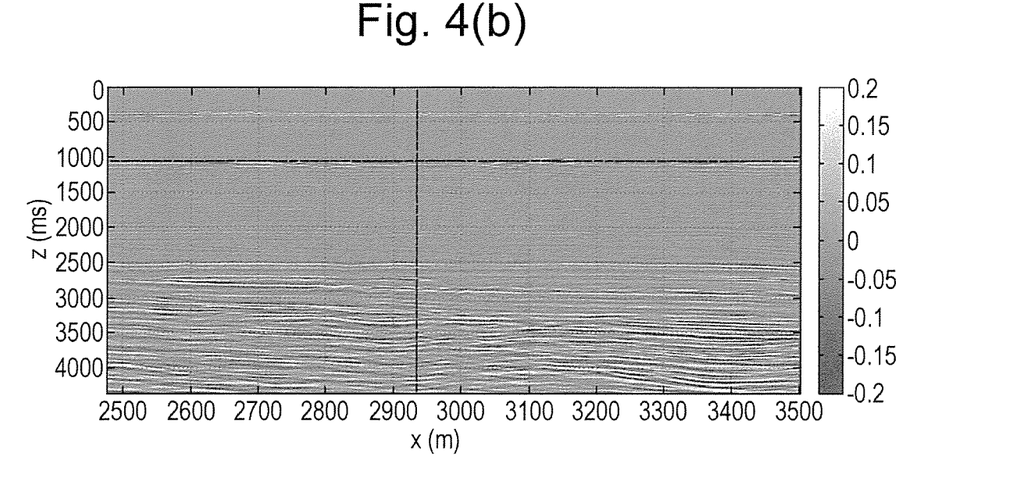
Figure 4C:
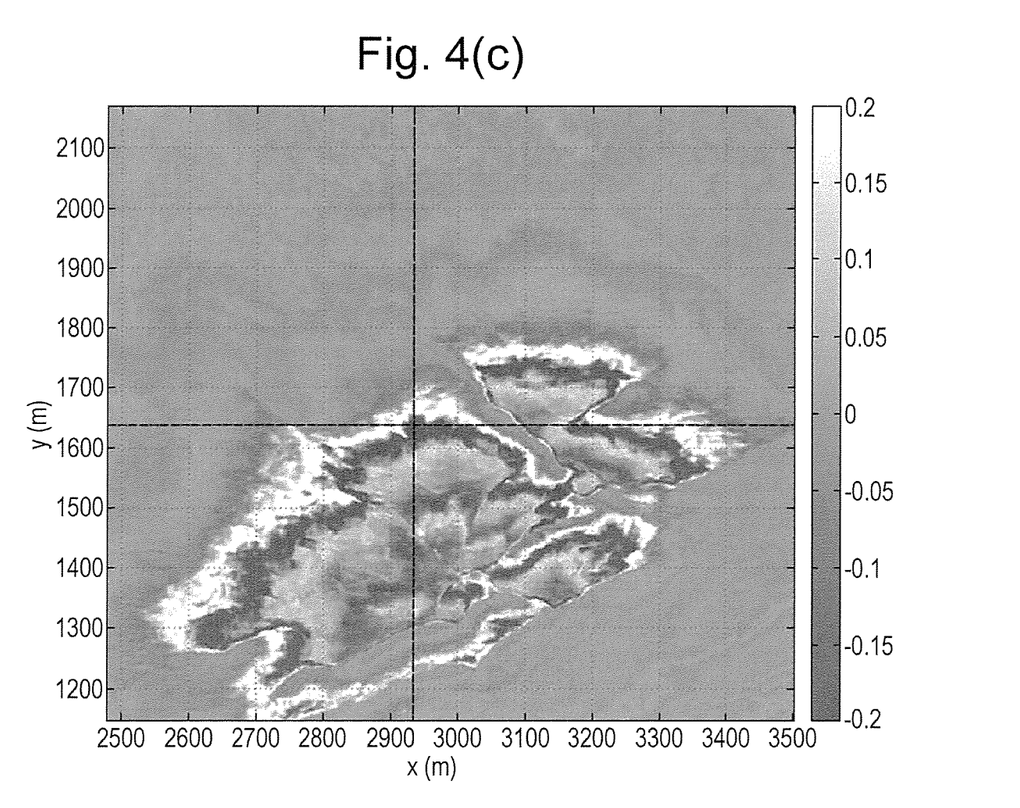

FIGS. 4(a) to (c) show 2D samples of real 3D seismic data. These 2D seismic data lines have been taken by slicing through a real 3D seismic data set at lines of constant easting (i.e. constant x, FIG. 4(a)), constant northing (i.e. constant y, FIG. 4(b)) and constant time (i.e. constant z, FIG. 4(c)). The dotted lines in each Figure denote the locations of the other slices plotted in the other Figures.

Figure 4D:
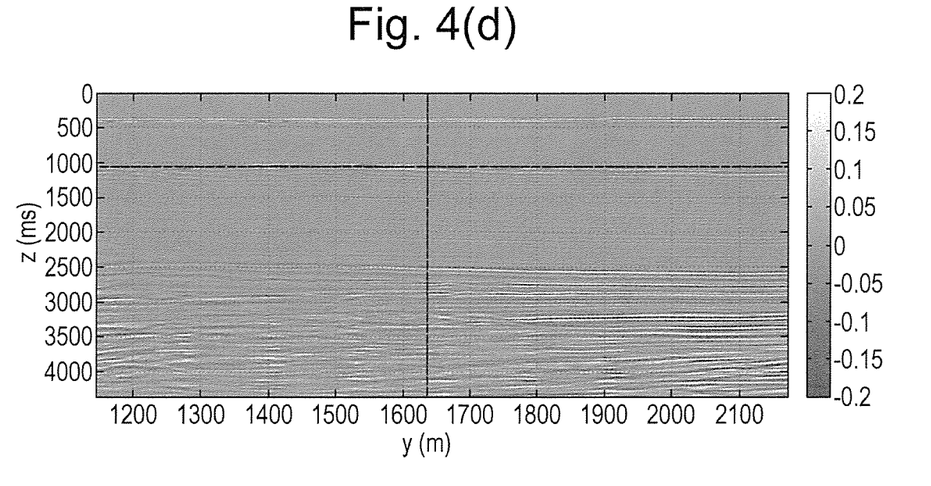
Figure 4E:
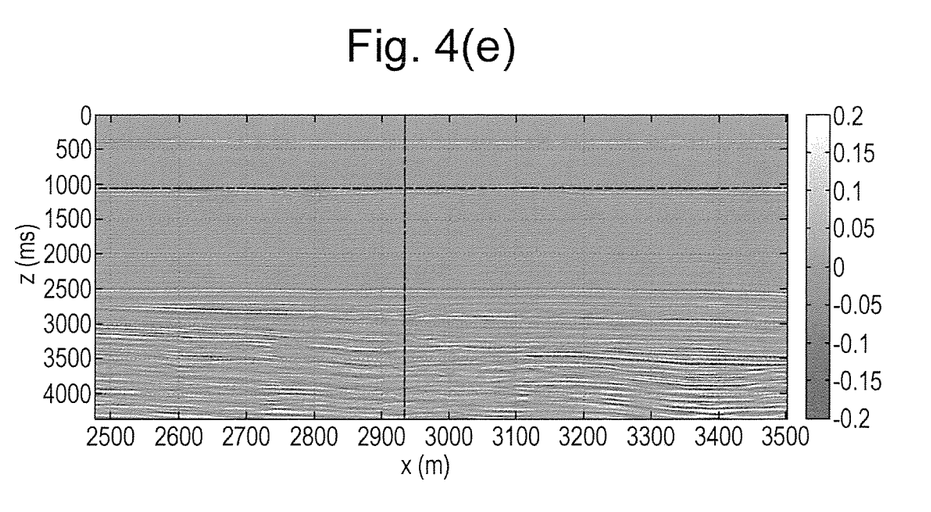
Figure 4F:
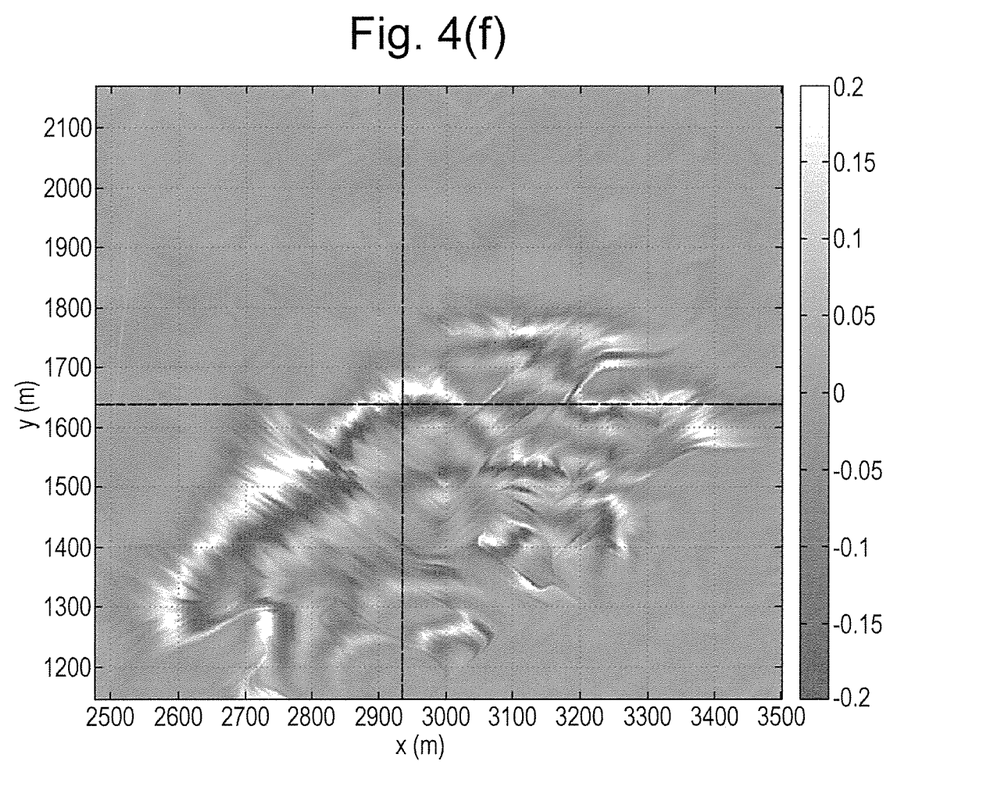

FIG. 4(d) to (f) show 2D samples of calculated 3D seismic data calculated using the present method. To generate the calculated 3D seismic data, a set of 2D samples of the real 3D seismic data were taken at intervals of approximately 130 m throughout the real 3D seismic data. This set of 2D samples hence formed a grid of 2D seismic data lines. The present method was used to generate the calculated 3D seismic data from the grid. 2D samples of this calculated 3D seismic data set corresponding to the locations and orientations of the 2D samples of the real 3D seismic data set of FIGS. 4(a) to 4(c) are shown in FIGS. 4(d) to 4(f). Thus, FIG. 4(d) shows a sample of the calculated 3D seismic data corresponding to the sample of the real 3D seismic data shown in FIG. 4(a). Likewise, FIG. 4(e) corresponds to FIG. 4(b) and FIG. 4(f) corresponds to FIG. 4(c).

Thus FIGS. 4(a) and 4(c), 4(b) and 4(d), and 4(c) and 4(f) can be compared as a quality control test of the present method, since 2D samples of a real 3D dataset (i.e. a measured 3D dataset) can be compared to 2D samples of calculated 3D dataset corresponding to the real 3D dataset.

Whilst the interval between the samples in the set of 2D samples of the real 3D seismic data was approximately 130 m, similar analysis could have been done for intervals of 16 m, 33 m, 65 m and 260 m, for example. These intervals may vary somewhat over the length of the sample lines because the geometry may be imperfect.

As can be seen by comparing the relevant Figures, the samples of the calculated 3D seismic data closely correlate to the corresponding samples of the real 3D seismic data.

Thus, these results show the effectiveness of the claimed invention. It should be noted that issues, such as aliasing issues, have been reduced.

It will be appreciated by the person of skill in the art that various modifications may be made to the above described embodiments without departing from the scope of the present invention, which is defined by the claims.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:
1. A method of processing seismic data, comprising:
   (a) performing de-migration to a migrated spatially irregular 2D seismic data set to produce a plurality of seismic data lines;
   (b) calculating a plurality of structure tensors for each of the plurality of seismic data lines, the seismic data lines being spatially distributed about an area of the Earth's surface;
   (c) interpolating the structure tensors to find interpolated structure tensors in a region of the area between the lines of the seismic data lines;
   (d) calculating seismic data from the interpolated structure tensors; and
   performing 3D migration or remigration to the seismic data to construct a spatially regular 3D seismic data set,
   wherein step (c) comprises:
   calculating eigenvalues and eigenvectors of each of the structure tensors;
   stepping the interpolation using the eigenvalues and eigenvectors to calculate the interpolated structure tensors adjacent the structure tensors; and
   repeating the eigenvalue and eigenvector-calculating step and the stepping step for the interpolated structure tensors until interpolation throughout the region(s) is complete.

2. A method as claimed in claim 1, wherein the seismic data used in step (a) is 2D seismic data.

3. A method as claimed in claim 2, wherein the step (a) comprises:
   estimating a gradient vector by estimating components of the gradient of the 2D seismic data within the 2D plane of the 2D seismic data; and
   calculating the outer product of the estimated gradient vector.

4. A method as claimed in claim 3, wherein step (a) further comprises applying smoothing.

5. A method as claimed in claim 1, wherein the seismic data is wavefield data.

6. A method as claimed in claim 1, wherein the seismic data is wavefield data, and wherein the eigenvector, and corresponding eigenvalue, used for the stepping step is tangential to the wavefield.

7. A method as claimed in claim 1, wherein the seismic data lines comprise 2D zero-offset stacks.

8. A method as claimed in claim 1, wherein the lines are sparsely distributed over the area of the Earth's surface.

9. A method as claimed in claim 1, wherein the lines are irregularly distributed over the areas of the Earth's surface.

10. A method as claimed in claim 1, wherein the seismic data lines comprise non-migrated or de-migrated seismic data.

11. A method as claimed in claim 1, wherein the seismic data lines comprise measured seismic data.

12. A computer program product comprising instructions that when executed will cause a processor perform a method as claimed in claim 1.

13. A computer program product as claimed in claim 12 stored on a storage medium.

14. Transmission of a program as claimed in claim 12 across a communications network.

15. A computer programmed to perform a method as claimed in claim 1.

16. An apparatus for processing data representing a physical system, the apparatus being arranged to perform a method as claimed in claim 1.

17. A method as claimed in claim 1, wherein the stepping step is dependent on survey geometry such that a stepping interval in space and/or time is approximately a factor of 10 smaller than an interval between adjacent seismic lines.

\* \* \* \* \*